(12) United States Patent
Gingerich et al.

(10) Patent No.: US 6,364,951 B1
(45) Date of Patent: Apr. 2, 2002

(54) MOISTURE INSENSITIVE ELECTROLUMINESCENT PHOSPHOR

(75) Inventors: Richard G. W. Gingerich, Towanda; Chen-Wen Fan, Sayre, both of PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/685,841

(22) Filed: Oct. 5, 2000

Related U.S. Application Data

(62) Division of application No. 09/406,359, filed on Sep. 28, 1999, now Pat. No. 6,171,650.

(51) Int. Cl.$^7$ .............................................. B05B 17/00
(52) U.S. Cl. ................................. 118/303; 118/DIG. 5
(58) Field of Search ....................... 118/DIG. 5, 303, 118/309; 427/212, 213, 64, 70, 255.394, 215

(56) References Cited

U.S. PATENT DOCUMENTS 5,126,166 A * 6/1992 Dulta et al.
6,113,807 A * 9/2000 Yamaura

* cited by examiner

Primary Examiner—Brenda A. Lamb
(74) Attorney, Agent, or Firm—William H. McNeill; Robert F. Clark

(57) ABSTRACT

A phosphor particle has thereon a moisture resistant treatment of a metallic nitride. By moisture resistant is meant a condition allowing the phosphor particle to function in a humid atmosphere for a significantly longer period of time than an untreated particle. The method of making such phosphors comprises the steps of introducing an inert gas into a reaction vessel; charging phosphor particles into the reaction vessel; heating the reaction vessel to a reaction temperature; introducing a nitride coating precursor into the reaction vessel in a manner to avoid restrictive reactions; introducing a co-reactant into the reaction vessel; and maintaining the inert gas flow, co-reactant flow and precursor supply for a time sufficient to moisture-proof the phosphor particles. The nitride treated phosphor particles produced by this method, which can include the deposition of a nitride coating on the particles, have excellent efficacy ratings and strong luminance values in lamps after 100 hours use in high humidity (i.e., >95%). By avoiding restrictive reactions the method and apparatus can be used to manufacture commercial quantities of coated phosphors.

1 Claim, 2 Drawing Sheets

MOISTURE INSENSITIVE ELECTROLUMINESCENT PHOSPHOR

This Application is a division of Ser. No. 09/406,359 Sep. 28, 1999 now U.S. Pat. No. 6,171,650.

TECHNICAL FIELD

This invention relates to electroluminescent phosphors and more particularly to electroluminescent phosphors that have been treated to be moisture resistant. More particularly, this invention relates to electroluminescent phosphors having greatly reduced moisture absorption and greatly increased life and efficacy.

BACKGROUND ART

Treated phosphors are known from U.S. Pat. Nos. 4,585,673; 4,825,124; 5,080,928; 5,118,529; 5,156,885; 5,220,243; 5,244,750; and 5,418,062. It is known from some of the just-mentioned patents that a coating precursor and oxygen can be used to apply a protective coating. See, for example, U.S. Pat. Nos. 5,244,750 and 4,585,673. The treatment processes in several of the others of these patents employ chemical vapor deposition to apply a protective coating by hydrolysis. It also has been reported that chemical vapor deposition, at atmospheric pressure, can be used to deposit thin films of aluminum nitride coatings from hexakis (dimethylamido)dialuminum and anhydrous ammonia precursors upon silicon, vitreous carbon and glass substrates. See, for example, "Atmospheric pressure chemical vapor deposition of aluminum nitride films at 200–250° C.", Gordon, et al., Journal Material Resources, Vol. 6, No. 1, January 1991; and "Chemical vapor deposition of aluminum nitride thin films", Gordon, et al., Journal Material Resources, Vol. 7, No. 7, July 1992. See, also, U.S. Pat. Nos. 5,139,825 and 5,178,911, Gordon, which also disclose transition metal nitrides and other metallic nitrides such as gallium and tin, respectively. U.S. Pat. No. 5,856,009 discloses a high temperature process (i.e., 300 to 700° C.) for applying a silicon nitride coating over a previously applied heat resistant coating on phosphor particles. U.S. patent application Ser. No. 09/175,787, filed 10/20/98 (incorporated herein by reference) and which claims priority from Provisional Application Ser. No. 60/072,510, filed Jan 12, 1998, discloses a nitride coating process using a highly reactive hexakis(dimethylamido)dialuminum that has been difficult to scale up to commercial quantities. It would be an advance in the art to provide a process for providing moisture resistant electroluminescent phosphors. It would be a further advance if that process operated in the absence of water or water vapor. It would be a further advance in the art to increase the efficacy and the life of such phosphors manufactured by such a process. It would be a still further advance in the art to provide a process that did not rely upon oxygen. It would be a still further advance in the art to provide an electroluminescent phosphor with a non-oxide coating such, for example, as a metallic nitride coating that is applied directly to the phosphor particles at a low temperature, i.e., about 100° C., so that the phosphor performance is not degraded. It would be a still further advance in the art to provide a process employing highly reactive materials that can yield commercial quantities of coated phosphor.

DISCLOSURE OF INVENTION

It is, therefore, an object of the invention to obviate the disadvantages of the prior art.

It is another object of the invention to enhance the operation of moisture-resistant phosphors.

Yet another object of the invention is the provision of a method for providing moisture resistant phosphors that does not employ water or water vapor, or oxygen.

Still another object is the provision of a method and apparatus for providing commercial quantities of nitride coated phosphors which method and apparatus employ highly reactive materials.

These objects are accomplished, in one aspect of the invention, by the provision of a phosphor particle having thereon a coating of a metallic nitride. The coating may be conformal to the particle surface. By conformal is meant a coating that follows the surface contours of the individual particles.

The objects additionally are accomplished by a process of preparing moisture resistant particles of electroluminescent phosphor, comprising the steps of: introducing an inert gas into a reaction vessel that is charged with phosphor particles; heating the reaction vessel to a reaction temperature; introducing a nitride coating precursor into the reaction vessel in a manner to avoid restrictive reactions; introducing a co-reactant into the reaction vessel; and maintaining the inert gas flow, co-reactant flow and precursor supply for a time sufficient to make the phosphor particles moisture resistant.

The objects are further accomplished by the provision of a method of making moisture-resistant phosphors which comprises the steps of introducing an inert gas into a reaction vessel; charging phosphor particles into the reaction vessel; heating the reaction vessel to a reaction temperature; introducing a nitride coating precursor into the reaction vessel in a manner to avoid restrictive reactions; introducing a co-reactant into the reaction vessel; and maintaining the inert gas flow, co-reactant flow and precursor supply for a time sufficient to coat the phosphor particles.

The nitrided phosphor particles produced by this method had excellent efficacy ratings and strong luminance values in lamps after 100 hours use in high humidity (i.e., >95%) and can be made in viable commercial quantities, such as 50 kg batches.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
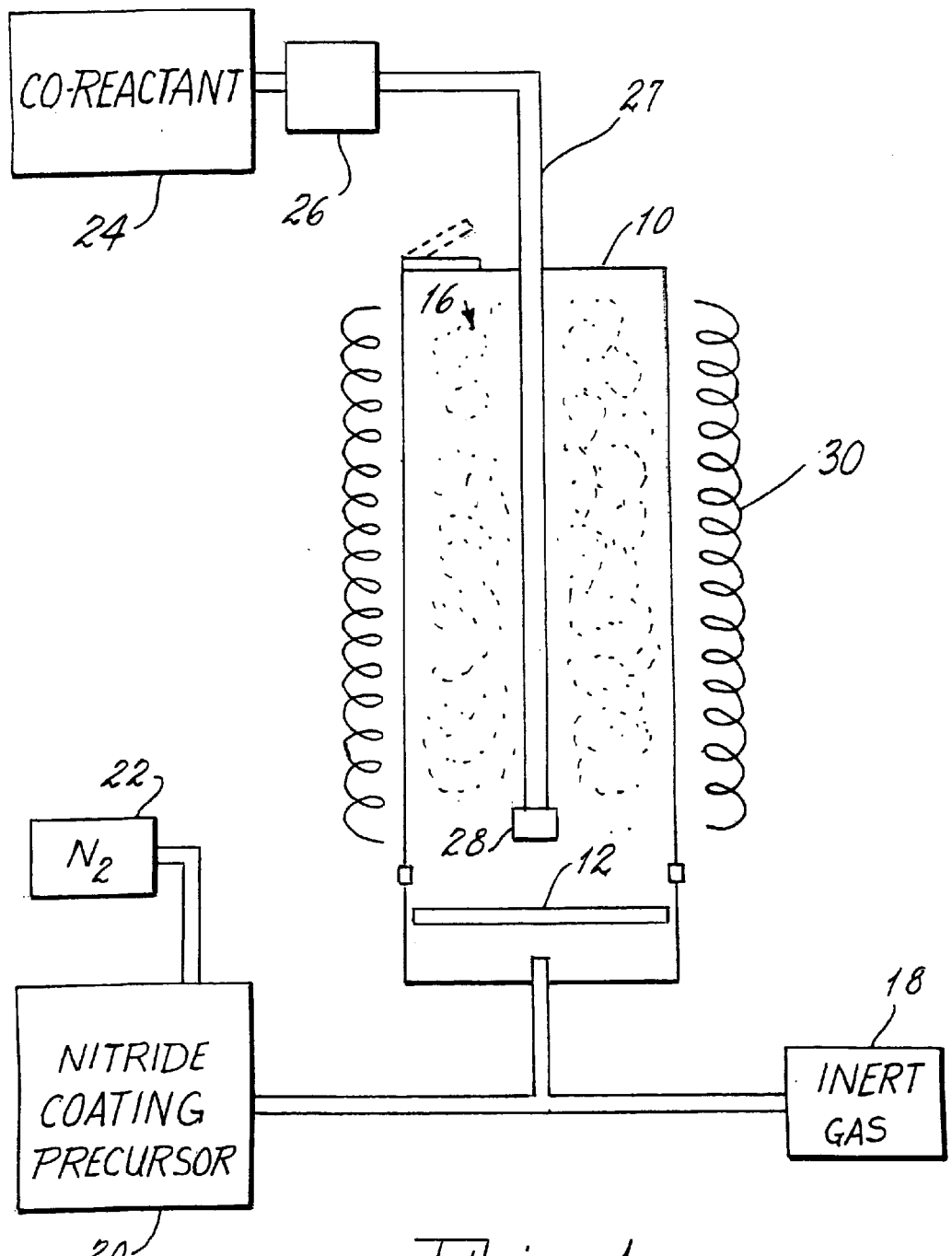
FIG. 1 is a diagrammatic view of a prior art process for coating the phosphors.

In a prior art embodiment of the invention shown in FIG. 1, the coating reaction was carried out in a gas-fluidized bed reaction vessel that comprised a one inch O.D. (2.54 cm) glass tube 10 with a coarse porosity, fitted glass disk 12 as the gas distributor and surrounded by a heater 30 for maintaining reactor temperature. The phosphor 16 employed was a Type 723 electroluminescent phosphor (ZnS:Cu) available from Osram Sylvana Inc., Towanda Pa. and the phosphor was fluidized by the injection of an inert gas such as nitrogen from a supply 18. The nitride coatings (which can contain amounts of hydrogen as well as the aluminum nitride) were formed via the reaction of anhydrous ammonia with hexakis(dimethylamido)dialuminum ($Al_2(N(CH_3)_2)_6$). However, there is no reason to believe that other organometallic nitrides would not work as well, particularly, for example those containing gallium or tin. The aliuminum nitride precursor was obtained from Strem Chemicals, Newburyport, Mass., and contained within a stainless steel bubbler. The bubbler was maintained at 100° C. and the precursor was transported to the reaction vessel by a carrier of purified nitrogen from supply 22. The precursor-entrained nitrogen was flowed upwards through the fritted glass distributor 12 through lines that were maintained 20 to 30° C. above the temperature of the bubbler. The anhydrous anmmonia co-reactant 24, which was obtained from Matheson Chemicals, Gloucester, Mass., was passed through a Unit mass flow controller 26 prior to entering the fluidized bed via a central glass tube 27 having a fritted glass tip 28. The anhydrous ammonia was diluted with purified nitrogen prior to entering the bed. Additionally, the nitrogen carrier was purified by passing through a Centorr purifier followed by a Matheson Nanochem gas purifier. The ammonia, also, was passed through a Nanochem purifier.

The gas handling system was constructed from stainless steel tubing and fittings. Glass-to-metal seals were employed between the glass reactor parts and the gas lines.

This process worked well in the apparatus described for small quantities of phosphor, i.e., in the range of 40 grams or so. However, problems arose with the attempt to scale up production to commercial quantities in the kilogram range.

The problem has been identified as stemming from the reactivity of the nitride precursor, in this case the hexakis (dimethylamido)dialuminum. This material reacts with the coarse porosity, fitted glass disk, plating nitrides on the sides of the pores therein. This is particularly true at the elevated temperatures of the reaction vessel, which are in the neighborhood of 150 to 225° C. In very short order the pores of the disk are plugged, stopping the desired reaction of nitride coating on the suspended phosphor particles.

Figure 2:
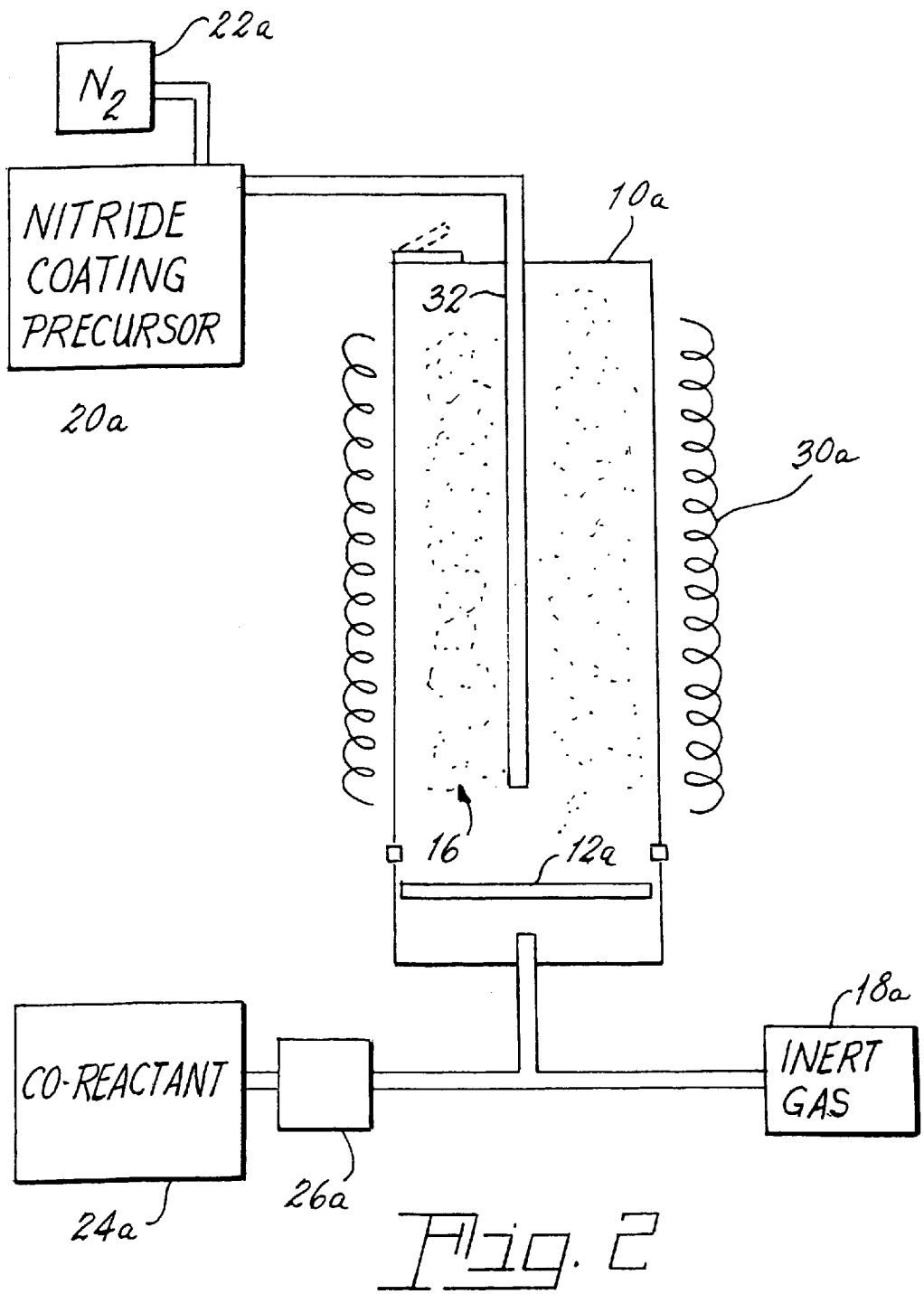
FIG. 2 is a diagrammatic view of the process of the invention.

The solution to this problem is presented in the apparatus and method illustrated in FIG. 2. Therein, a reaction vessel 10a, which can be a stainless steel vessel having a diameter greater than 10 inches and being surrounded by a suitable heater 30a to bring the reaction vessel to a coating temperature between 150 and 225° C., has the coating precursor introduced into the vessel in a manner to avoid restrictive reactions. In the embodiment illustrated this is accomplished by entraining the precursor with nitrogen from supply 22a and feeding the entrained precursor from the top of the reaction vessel 10a through tube 32, which is open for its entire length and is not provided with a fritted glass tip. The co-reactant, in this case diluted anhydrous ammonia, can be fed from the bottom of vessel 10a and passed through the porous glass disk 12a. The initial supply of inert gas, which can also be nitrogen and which is used for initially fluidizing the phosphor particles, can also be fed from the bottom of vessel 10a, through disk 12a.

Thus, by feeding the nitride coating precursor in a manner to avoid restrictive reactions, nitride coated phosphors are prepared in commercial quantities in an economic system.

While there have been shown and described what are at present considered the preferred embodiments of the invention, it will be apparent to those skilled in the art that various changes and modifications can be made herein without departing from the scope of the invention as defined by the appended claims.

What is claimed is:

1. An apparatus for manufacturing commercial quantities of nitride coated electroluminescent phosphors via a fluidized bed comprising: a reaction vessel sized to accommodate said commercial quantities of said phosphor, said reaction vessel having a first end containing a porous, gas dispersing disk and a second end spaced therefrom; at least a first supply of an inert gas in fluid communication with said disk for initially fluidizing said phosphor a supply of a nitride coating precursor; a supply of a carrier in fluid communication with said supply of nitride coating precursor for entraining said precursor thereby forming an entrained coating precursor; a supply of a co-reactant in fluid communication with said disk such that said co-reactant flows therethrough; and a delivery means in fluid communication with said supply of carrier and said supply of nitride coating precursor for providing said entrained coating precursor which enters said vessel through said second end.

\* \* \* \* \*